US012181119B2

(12) United States Patent
Herold et al.

(10) Patent No.: US 12,181,119 B2
(45) Date of Patent: Dec. 31, 2024

(54) HEADLAMP FOR VEHICLES

(71) Applicant: Hella GmbH & Co. KGaA, Lippstadt (DE)

(72) Inventors: Florian Herold, Bielefeld (DE); Ingo Möllers, Rietberg (DE); Peter Rausch, Münster (DE); Patrick Vogel, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/536,495

(22) Filed: Dec. 12, 2023

(65) Prior Publication Data

US 2024/0200749 A1 Jun. 20, 2024

(30) Foreign Application Priority Data

Dec. 14, 2022 (DE) ......................... 102022133205.5

(51) Int. Cl.
*F21S 41/63* (2018.01)
*F21S 41/153* (2018.01)
*F21S 41/663* (2018.01)

(52) U.S. Cl.
CPC ........... *F21S 41/635* (2018.01); *F21S 41/153* (2018.01); *F21S 41/663* (2018.01)

(58) Field of Classification Search
CPC .............................. F21S 41/635; F21S 41/153
See application file for complete search history.

(56) References Cited

U.S. PATENT DOCUMENTS 7,182,463 B2 2/2007 Conner et al.

FOREIGN PATENT DOCUMENTS

DE 102011054229 A1 4/2013
DE 102014207750 A1 * 10/2015 .......... F21S 48/1154
DE 112019003562 T5 3/2021

* cited by examiner

*Primary Examiner* — Sean P Gramling
(74) *Attorney, Agent, or Firm* — Husch Blackwell LLP

(57) ABSTRACT

A headlamp for vehicles is provided with a light source unit a matric of light sources. An optics unit is positioned in front of the light source unit in the main beam direction which focuses the light sources into light spots in a predefined light distribution. The light source unit is positioned at a predefined distance to the light entry surface on the optics unit along an optical axis. An optics element that moves transverse to the optical axis of the light source unit and/or optics unit is placed between the light source unit and a light emission surface of the optics unit. The light spots are in a first position when the adjustable optics element is in a first setting, and the same light spots are offset from the first position along a displacement path when the adjustable optics element is in a second setting.

13 Claims, 3 Drawing Sheets

HEADLAMP FOR VEHICLES

CROSS REFERENCE

This application claims priority to German Application No. 102022133205.5, filed Dec. 17, 2022, the entirety of which is hereby incorporated by reference.

FIELD OF THE INVENTION

The invention relates to a headlamp for vehicles, which has a light source unit containing numerous light sources arranged in a matrix, with an optics unit in front of the light source unit in the main beam direction which focuses the light from the light sources into light spots with which a predefined light distribution is obtained, in which the optics unit has a light entry surface on the side facing the light source unit, and a light emission surface on the side facing away from the light source unit, and the light source unit is at a predefined distance to the light entry surface on the optics unit along an optical axis, and which has a control unit for the light sources.

BACKGROUND OF THE INVENTION

A headlamp for vehicles that has a light source unit and an optics unit for generating a predefined light distribution is disclosed in DE 10 2011 054 229 A1. The light source unit has numerous light sources arranged in a matrix, the light from which is focused into light spots in a light distribution by the optics unit. The optics unit has a preliminary optics element that is placed directly on the light source unit. This increases the efficiency of the luminous flux. Because a light field in the light distribution that is to be dimmed by deactivating numerous light spots to avoid blinding another road user located therein constantly changes with regard to its size and position due to the changing distance between the headlamp and the other road user while the vehicle is moving, it is desirable to be able to prevent an unintentional blinding of other road users in a simple manner.

A projector for generating a lighting effect is disclosed in U.S. Pat. No. 7,182,463 B2, which contains a light source, a liquid crystal unit, and an optics unit. The optics unit has a pixel displacement element for increasing the resolution of the light pixels in the liquid crystal unit, with which pixels can be displaced in a plane. This pixel displacement element in the form of a mirror is moved back and forth periodically such that a virtual increase in the resolution is obtained by overlapping the light spots.

BRIEF SUMMARY OF THE INVENTION

The object of the present invention is therefore to improve on a headlamp for vehicles such that a homogenous light distribution is obtained in a simple manner, and it is also easy to precisely address portions of the light distribution.

This problem is solved by an embodiment of the invention in which an optics element that can be moved periodically, transverse to the optical axis of the light source unit and/or optics unit, which is placed between the light source unit and the light emission surface of the optics unit such that the light spots are in a first position when the adjustable optics element is in a first setting, and the same light spots are in a second position, offset to the first position along a displacement path, when the adjustable optics element is in a second setting.

The invention results in an adjustable optics element that can be moved, transverse to the optical axis, between two settings such that the light distribution generated by the headlamp can be moved back and forth along a predefined displacement path. Because these positions alternate, i.e. between the first setting of the adjustable optics element and the second setting, a larger number of light spots in the light distribution can be addressed than if the adjustable optics element were not moved. This results in an improved homogenization of the light distribution, because the light is more evenly distributed along a light/dark boundary. Moreover, it is easier to "track" other road users in the light distribution where the light is to be dimmed, thus reducing the risk of unintentionally blinding them. The fundamental idea of the invention is to homogenize the difference in brightness along a light/dark boundary, or between an illuminated area and an area that is not illuminated, such that the light striking another road user can be more precisely dimmed, and to minimize the risk of blinding the other road user due to the comparatively low difference in brightness at the light/dark boundary.

According to a preferred embodiment of the invention, the adjustable optics element is a lens element with which the light from all of the light sources passing through the optics unit is focused into light spots, which are moved laterally along the same displacement path on a measurement screen. The adjustable optics element therefore has focusing properties that act in the same manner on all of the light sources. To reduce the difficulties in producing the adjustable optics element, it is beneficial if the light source unit is substantially smaller than the adjustable optics element in the plane transverse to the optical axis.

According to one aspect of the invention, the adjustable optics element can be moved back and forth between two settings. This simplifies the actuation of the adjustable optics element.

According to a preferred embodiment of the invention, the adjustable optics element is actuated such that it is moved back and forth over the same displacement path in a straight line. If this movement is at a diagonal to the matrix arrangement of the light sources, the light/dark boundary can be homogenized in two dimensions, i.e. along the horizontal plane and the vertical. This results in a virtual doubling of the light spots, if the displacement is equal to one half the height and one half the width of the light spots.

According to an alternative embodiment of the invention, the adjustable optics element is moved back and forth in two directions, such that the light spots are displaced diagonally. This advantageously simplifies the actuation of the actuator, because it only needs to be moved in two directions that are at a right angle to one another.

According to one aspect of the invention, a control unit with a synchronizer sends a first synchronization signal to the light source unit and a second synchronization signal to the actuator. These two synchronization signals are set such, or ensure that, the desired light source is switched on and off at a predefined switching frequency, and that the actuator is moved back and forth at the same switching frequency. As a result, the adjustable optics element is only moved when the light sources are switched off. This means that light spots of specific sizes can advantageously be generated at specific locations.

According to a preferred embodiment of the invention, the adjustable optics element is on the side of the optics unit facing the light source unit, such that existing headlamp systems can be easily retrofitted.

According to one aspect of the invention, a cover in the form of a funnel is located between the light source unit and the optics unit, which connects a rim on the light source unit with a rim on the optics unit or the adjustable optics element. This prevents diffused light from exiting laterally.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
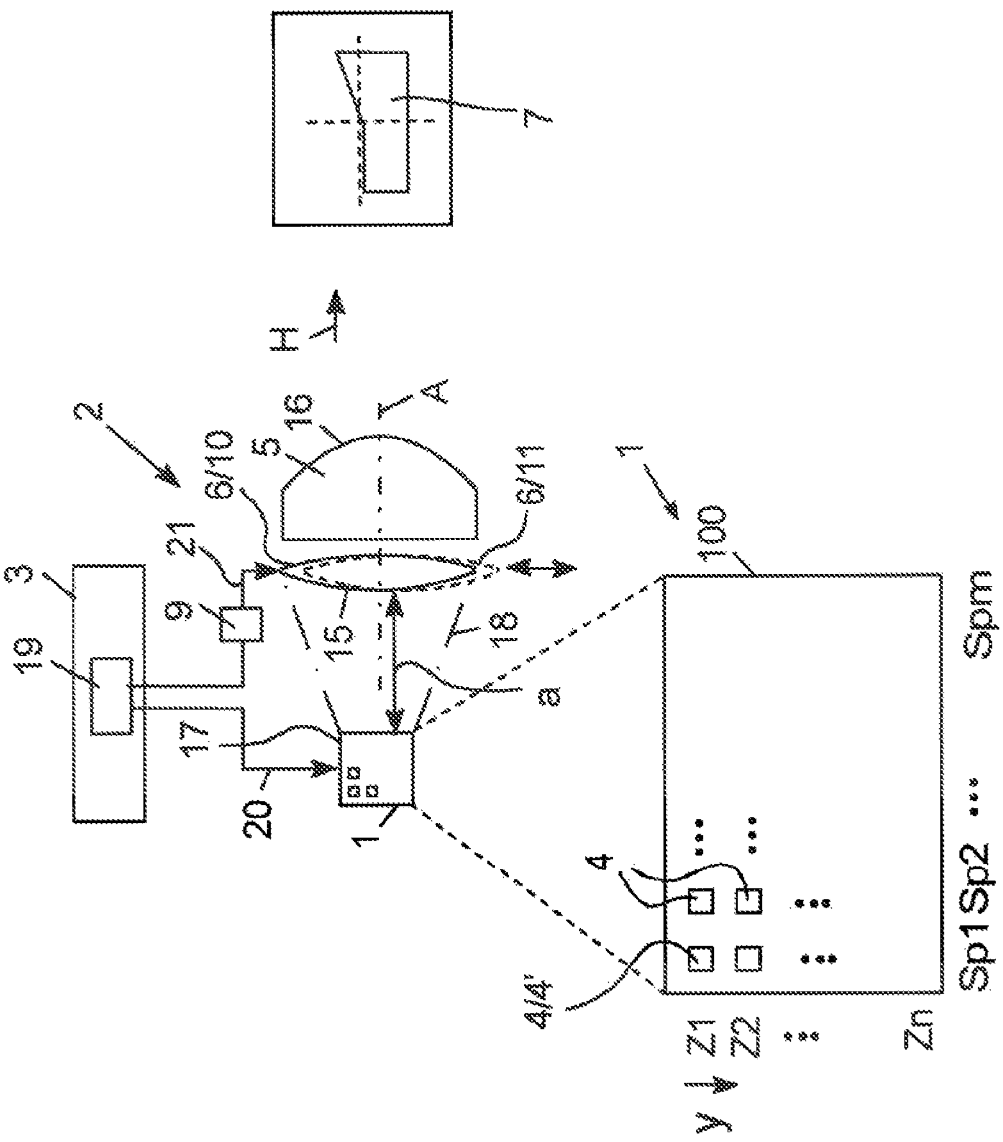
FIG. 1 shows a schematic illustration of a headlamp according to the invention.

A vehicle headlamp is substantially composed of a light source unit 1, an optics unit 2, and a control unit 3.

The light source unit 1 has numerous light sources 4 in a matrix arrangement, which are preferably LED light sources. The light sources 4 are preferably all on the same chip. The light sources 4 are in numerous rows Z1, Z2, Zn and numerous columns, Sp1, Sp2, Spm, with the columns Sp1, Sp2, Spm distributed along the x-axis, perpendicular to the rows Z1, Z2, Zn (along the y-axis). The light sources 4 are therefore arranged in a grid in a light source field 100.

The optics unit 2 comprises at least one stationary lens element 5 and one optics element 6 that can be displaced and/or adjusted in a direction perpendicular to the optical axis A of the optics unit 2, with which a predefined light distribution 7, e.g. a low beam light distribution or a non-blinding high beam light distribution, can be generated independently of the setting of the adjustable optics element 6.

The optics unit 2 is designed such that it projects the individual light sources 4 onto light spots 8 of the same size on a measuring screen, which can be at a distance of 25 meters.

It is assumed in these exemplary embodiments that the light spots 8 are square, and when the light sources 4 are switched on, the light spots 8 are arranged in a matrix in the rows Z1, Z2, Zn and columns Sp1, Sp2, . . . Spm. The rows Z1, Z2, Zn extend vertically downward along the y-axis, and the columns Sp1, Sp2, . . . Spm extend horizontally, along the x-axis in a coordinate system.

The control unit 3 has means for controlling the light source unit, or individual light sources 4, and means for controlling an actuator 9 with which the adjustable optics element 6 can be moved back and forth between at least a first setting 10 and a second setting 11. The actuator 9 can be formed by a servomotor, which has a control element that can be moved linearly, potentially by a gear system, which is connected or coupled to the adjustable optics element 6.

Figure 2:
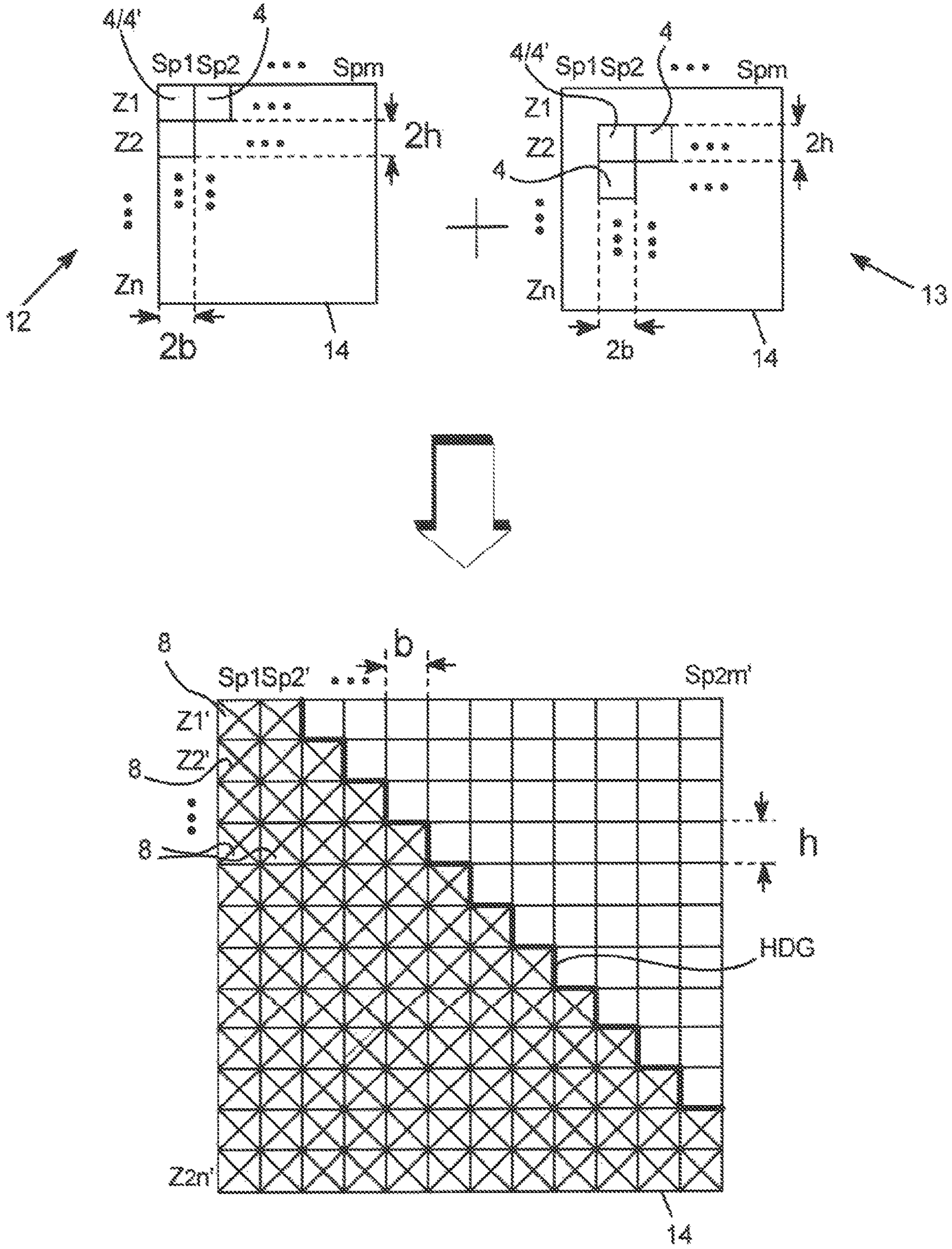
FIG. 2 shows a partial view of a light distribution on a measurement screen, with a diagonal light/dark boundary.

The adjustable optics element 6 itself has a lens surface, which can be convex or concave, such that by moving the adjustable optics element 6 from the first setting 10 to the second setting 11, the projection of the light sources 4 is shifted diagonally from a first position 12 to a second position 13. As can be seen in FIG. 2, the light spot L1 from the light source 4' in column Sp1 and row Z1 forms the light spot L1 in the column Z1 and row SP1 on the measurement screen when the adjustable optics element 6 is in the first setting 10, and forms the light spot L1' in row Z2 and column Sp2 on the measurement screen when the adjustable optics element 6 is in the second setting 11. All of the light sources 4, 4' that are switched on are therefore moved diagonally along the displacement path s on the measurement screen when the adjustable optics element 6 is moved from the first setting 10 to the second setting 11.

Because the adjustable optics element 6 is moved back and forth periodically between the first setting 10 and second setting 11 by the actuator 9 at a relatively high frequency that is faster than the human eye can perceive, a part of light/dark boundary HDG of the light distribution 7 shown in FIG. 2 appears to have a higher resolution. The light/dark boundary HDG appears to have twice as many steps, or steps of half the height h, as when the adjustable optics element 6 is not displaced. This results in a more precise and homogenous light/dark boundary HDG.

The overlapping light spots 4 obtained with the two settings 10, 11 of the adjustable optics element 6 generate light spots 8, such that the light field 14 contains, instead of n-rows an m-columns, twice as many rows Z1' . . . Z**2*n'*, and columns Sp1' . . . SP2*m'*, specifically Zn rows and Zm columns. The light spots 8 that are obtained are therefore half the height h and half the width b of the light spots 4 obtained when the adjustable optics element 5** is not moved.

In the present exemplary embodiment, the adjustable optics element 6 is on a side of the lens element 5 facing the light source unit 1. The side of the adjustable optics element facing the light source unit 1 therefore forms a light entry surface 15. The side of the lens element 5 facing away from the adjustable optics element 6 forms a light emission surface 16 of the optics unit 2.

The light source unit 1 is at a predefined distance a to the optics unit 2. The light source unit 1 is substantially smaller than the light entry surface 15. The light source unit 1 is specifically 50% smaller than the light entry surface 15. In the present exemplary embodiment, the light entry surface 15 is a cross section surface of the optics unit 2. In particular, the surface area of the light source unit 1 is less than 10% or 5% of the light entry surface 15. In the present exemplary embodiment, the surface area of the light entry surface 12 is substantially equal to the surface area of the light emission surface 16 on the optics unit 2.

The light source unit 1 preferably has a preliminary optics, which focuses the light from the light sources 4 toward the light entry surface 15 on the optics unit 2.

There can also be a cover 17 in the shape of a funnel between the light source unit 1 and the optics unit 2, with a rim 18 facing the light source unit 1 that corresponds to the rim of the light source unit 1, and/or covers the rim of the light source unit 1. This tapered cover 17 is indicated by a line composed of dots and dashes in FIG. 1.

In an embodiment of the invention not shown in the drawings, the adjustable optics element 6 can also be close to the light source unit 1, such that the distance to the light source unit 1 is shorter than the distance to the other lens elements 5 in the optics unit 2.

According to an alternative embodiment of the invention, the adjustable optics element 6 can also be on a side of the optics unit 2 facing away from the light source unit 1, i.e. in front of the optics unit 2 in the main beam direction H. In this case, one side of the adjustable optics element 6 forms the light emission surface 16 for the optics unit 2.

Figure 3:
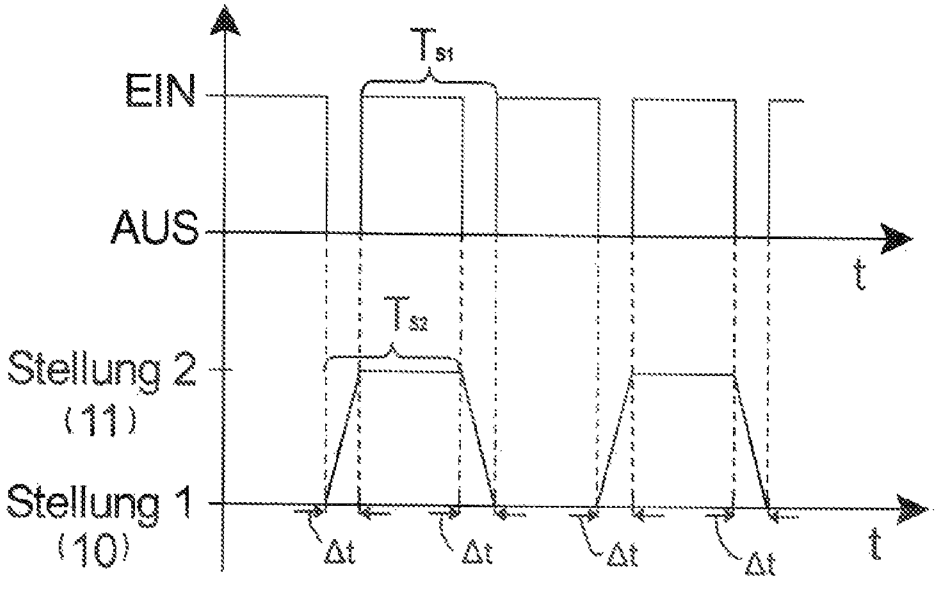
FIG. 3 shows a time diagram for the actuation of the light source unit and an actuator for moving the adjustable optics element.

The control unit 3 preferably has a synchronizer 19, and the light sources 4 in the light source unit 1 are controlled by a first synchronization signal 20 with which the light sources 4 with which the light distribution 7 is generated are switched on and off at a switching frequency. The switching frequency has a period $T_{S1}$, as indicated in FIG. 3. The synchronizer 19 also generates a second synchronization signal 21 that acts on the actuator 9 such that the adjustable optics element 6 is moved back and forth at a setting frequency between the first setting 10 and the second setting 11. The switching frequency has a period TS2, as indicated in FIG. 3. The switching frequency and setting frequency are the same. As can be seen in FIG. 3, the adjustable optics element 6 moves from the first setting 10 to the second setting 11 and back in intervals Δt, during which the light sources 4 in question are switched off. Consequently, light is only emitted during the intervals in which the adjustable optics element 6 is stationary. This ensures that the light spots 8' are only overlapped in two different positions of the light spots 8.

The setting frequency, or switching frequency, is in a range of 30 Hz to 500 Hz.

Figure 4:
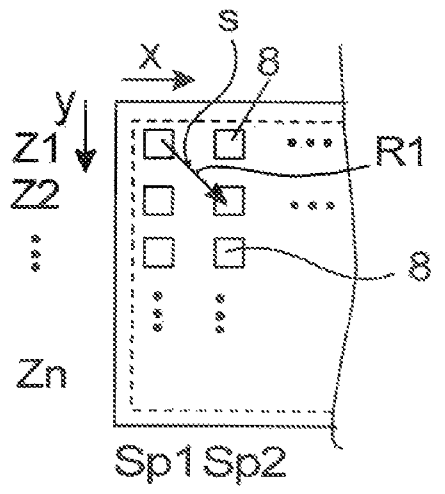
FIG. 4 shows a schematic illustration of a displacement of light sources in the light source unit with a single diagonal movement of the adjustable optics element along a straight line.
Figure 5:
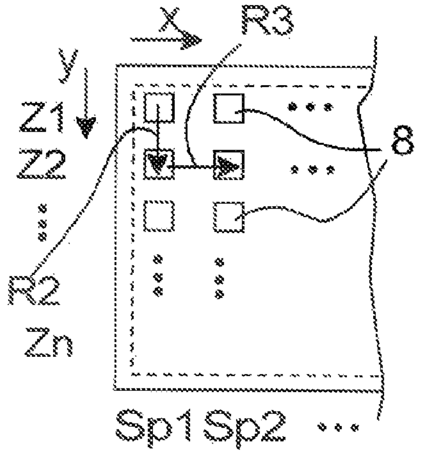
FIG. 5 shows a schematic illustration of a displacement of light sources in the light source unit with a movement of the adjustable optics element in two directions that are perpendicular to one another along a straight line.

According to a first embodiment of the actuator 9, it is controlled such that the adjustable optics element 6 moves in a single, straight direction between the first setting 10 and the second setting 11, such that the light spots 8 are moved diagonally in the direction R1 shown in FIG. 4.

In a second embodiment of the actuator 9, it is controlled such that the adjustable optics element 6 moves from between the first setting 10 and second setting 11 in two different directions R2, and R3, which are perpendicular to one another, such that the light spots 8 are moved back and forth between the first position 12 and second position 13 along the x-axis and along the y-axis. In this embodiment, the speed of the actuator 9 between the first setting 10 and second setting 11 of the adjustable optics element 6, or the speed of the adjustable optics element 6 itself, is substantially constant.

It should be noted that the light source field 100 is projected onto a light distribution field Zn×Spm, or Z2'×SP2*m*' on the measurement screen.

The light spots 8 can also be rectangular or nearly rectangular, in which case the height h is preferably greater than the width b.

LIST OF REFERENCE SYMBOLS

1 light source unit
2 optics unit
3 control unit
4, 4' light source
5 lens element
6 adjustable optics element
7 light distribution
8 light spot
9 actuator
10 first setting
11 second setting
12 first position
13 second position
14 light field
15 light entry surface
16 light emission surface
17 cover in the shape of a funnel
19 synchronizer
20 first synchronization signal
21 second synchronization signal
100 light source field
A optical axis
a distance
s displacement path
Δt interval
HDG light/dark boundary
H main beam direction
Z1, Z2, Zn, Z2*n* rows
Sp1, Sp2, Spm, Sp2*m* columns
L1, L1' light spots
h half height
b half width
$T_{S1}$, $T_{S2}$ period
R1, R2, R3 direction of movement

We claim:

1. A headlamp for vehicles, the headlamp comprising:

a light source unit containing a plurality of light sources arranged in a matrix;

an optics unit including an optics element, the optics unit positioned in front of the light source unit in a main beam direction (H), wherein the optics unit focuses light from the light sources into light spots with which a predefined light distribution is obtained, wherein the optics unit has a light entry surface on a side facing the light source unit, and has a light emission surface on a side facing away from the light source unit, wherein the light source unit is positioned at a predefined distance (a) to the light entry surface on the optics unit along an optical axis (A); and a control unit operably connected to the light sources and the optics element, wherein the optics element is movable transverse to the optical axis (A) of the light source unit and/or optics unit, the optics element being positioned between the light source unit and the light emission surface of the optics unit such that the light spots are in a first position when the optics element is in a first setting, and the same light spots are in a second position offset to the first position along one or more displacement paths when the adjustable optics element is in a second setting, wherein the control unit has a synchronizer that generates a first synchronization signal with which the light sources are switched on and off at a switching frequency, and a second synchronization signal with which an actuator is actuated such that the optics element is moved back and forth between the first and second positions at a setting frequency, wherein the setting frequency and switching frequency are the same, and wherein the light sources are on while the optics element is in the first setting or in the second setting and the light sources are off while the optics element moves between the first setting and the second setting.

2. The headlamp according to claim 1, wherein the control unit is connected to an actuator with which the optics element can be moved back and forth between the first setting and the second setting.

3. The headlamp according to claim 1, wherein the optics element forms a lens element with which the light is deflected such that all of the light spots formed by the optics unit are moved from the first position to the second position along the same displacement path(s).

4. The headlamp according to claim 1, wherein the actuator acts on the optics element with a control element such that it can be moved back and forth along a straight line in at least one direction.

5. The headlamp according to claim 1, wherein the optics element projects the light sources onto a measurement screen in rectangular light spots.

6. The headlamp according to claim 1, wherein an actuator can selectively cause the optics element to move back and forth, transverse to the optical axis (A), between the first setting the second setting, such that the light spots are moved along a straight line, in a direction (R1), from the first position to the second position.

7. The headlamp according to claim 1, wherein an actuator can selectively cause the optics element to move back and forth, transverse to the optical axis (A), between the first setting and second setting, such that the light spots are moved in multiple directions (R2, R3) from the first position to the second position.

8. The headlamp according to claim 1, wherein the displacement path(s) for the optics element is selected such that the light spots are moved on a measurement screen between the first position and the second position by half of a width (b) of the light spots and/or half of a height (h) of the light spots.

9. The headlamp according to claim 1, wherein the switching frequency and setting frequency are between 30 Hz and 500 Hz.

10. The headlamp according to claim 1, wherein the optics element is on a side of the optics unit facing the light source unit.

11. The headlamp according to claim 1, wherein the optics unit includes the optics element and at least two other lens elements.

12. The headlamp according to claim 1, wherein a cover in the form of a funnel is placed between the light source unit and the optics unit, which has a rim facing the light source unit that corresponds to a rim of the light source unit.

13. The headlamp according to claim 1, wherein the light sources are LED light sources on a single chip.

* * * * *